United States Patent [19]

Schimmels

[11] 4,440,331
[45] Apr. 3, 1984

[54] PROTECTIVE CHILD CARRIER ASSEMBLY

[76] Inventor: Kristin L. Schimmels, S. 2211 Conklin Rd., Veradale, Wash. 99037

[21] Appl. No.: 327,248

[22] Filed: Dec. 3, 1981

[51] Int. Cl.³ .............................................. B62J 7/04
[52] U.S. Cl. ......................................... 224/31; 224/39; 224/30 R; 280/202; 297/184; 297/379; 297/243
[58] Field of Search ................... 224/31, 32 A, 32 R, 224/30 R, 33 R, 39, 275; 280/202, 289 A, 220, 290, 291; 297/243, DIG. 9, 195, 184, 230, 250, 255, 377, 379, 394, 396, 408; 5/118, 119

[56] References Cited

U.S. PATENT DOCUMENTS

| | | |
|---|---|---|
| 2,229,756 | 1/1941 | McCann et al. |
| 2,661,959 | 12/1953 | Bell ................................... 297/184 |
| 3,556,587 | 1/1971 | Rymes . |
| 3,567,275 | 3/1971 | Bukey . |
| 3,902,737 | 9/1975 | Berger et al. |
| 3,999,801 | 12/1976 | Walters . |
| 4,026,448 | 5/1977 | Lewis . |
| 4,027,915 | 6/1977 | Anderson et al. ................ 297/184 |
| 4,030,648 | 6/1977 | Johnson et al. |
| 4,051,985 | 10/1977 | Berger . |
| 4,053,091 | 10/1977 | Martelet . |
| 4,082,350 | 4/1978 | Tomforde ......................... 297/250 |
| 4,085,968 | 4/1978 | Svensson et al. ................. 280/202 |
| 4,113,306 | 9/1978 | von Wimmersperg ........... 297/377 |
| 4,146,159 | 3/1979 | Hemmen ........................... 224/275 |
| 4,183,580 | 1/1980 | Johansson ......................... 297/250 |
| 4,186,962 | 2/1980 | Meeker ............................. 297/377 |
| 4,274,674 | 6/1981 | Deloustal .......................... 297/250 |
| 4,314,727 | 2/1982 | Potts ................................. 297/184 |
| 4,339,149 | 7/1982 | Nakao et al. ..................... 297/250 |

FOREIGN PATENT DOCUMENTS 592125 9/1947 United Kingdom ............ 224/32 A

*Primary Examiner*—Allan N. Shoap
*Assistant Examiner*—Robert Petrik
*Attorney, Agent, or Firm*—Wells, St. John & Roberts

[57] ABSTRACT

A carrier for children, adaptable for use in different vehicles and for providing maximum safety for the child rider. The carrier includes a base section and backrest section. The backrest section may pivot on the base section to provide adjustable angular back support to the rider. A protective cover may be secured to the backrest section, protecting the head and upper torso of the rider. The carrier may be especially adapted to fit on a bracket arrangement mounted to a bicycle, allowing the carrier to be used effectively on a bicycle.

12 Claims, 6 Drawing Figures

U.S. Patent    Apr. 3, 1984    Sheet 1 of 3    4,440,331
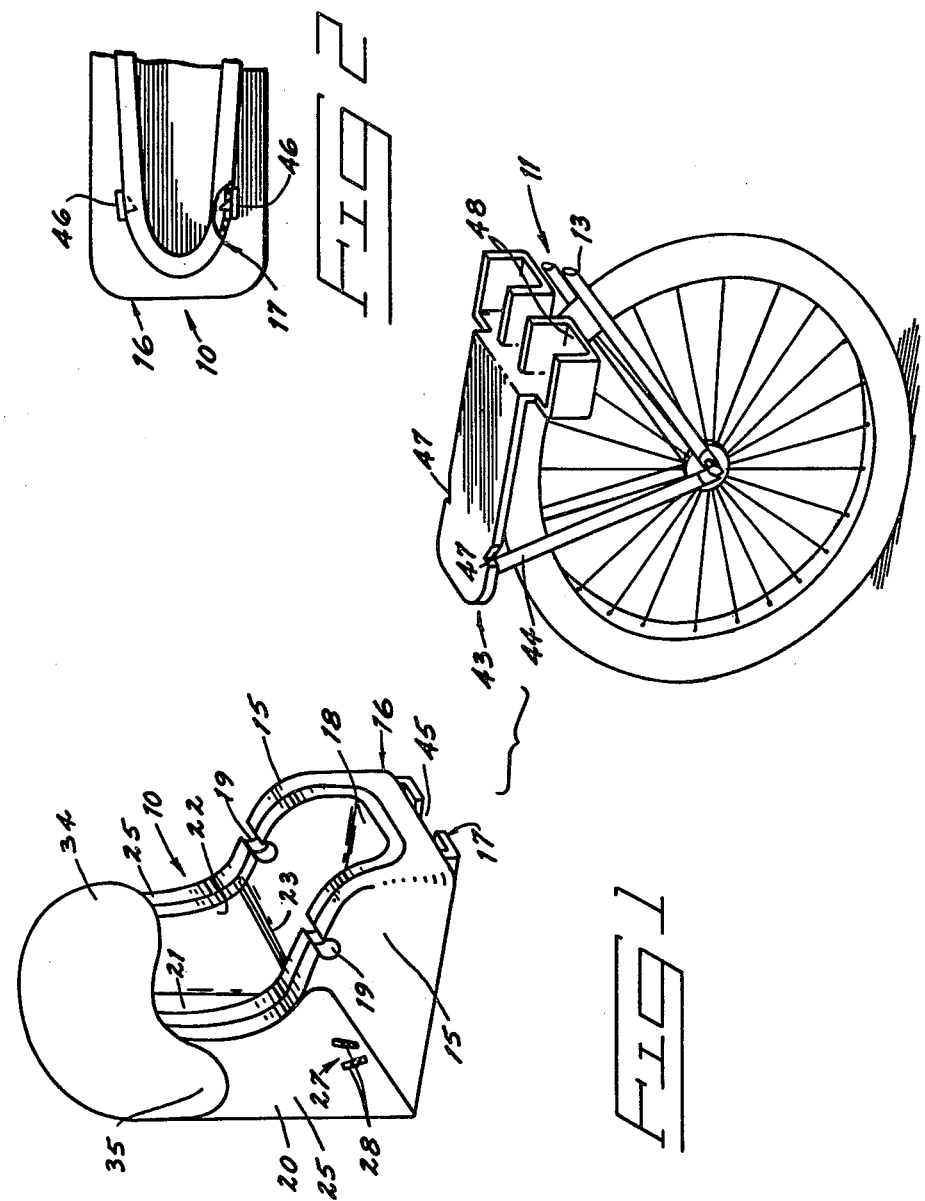

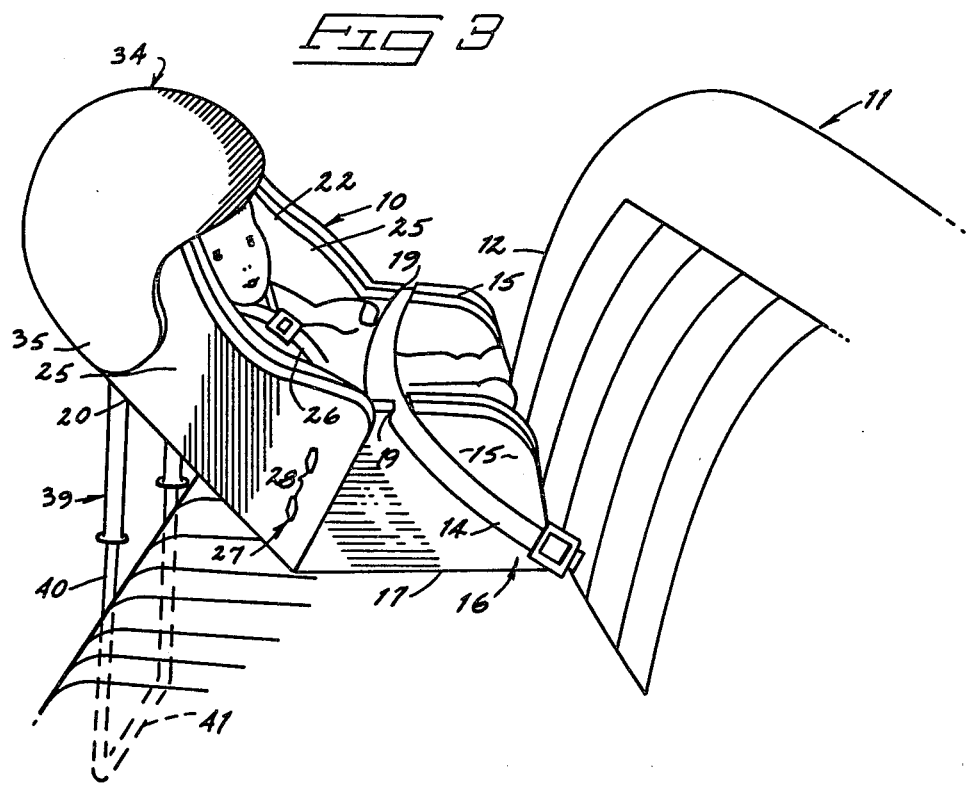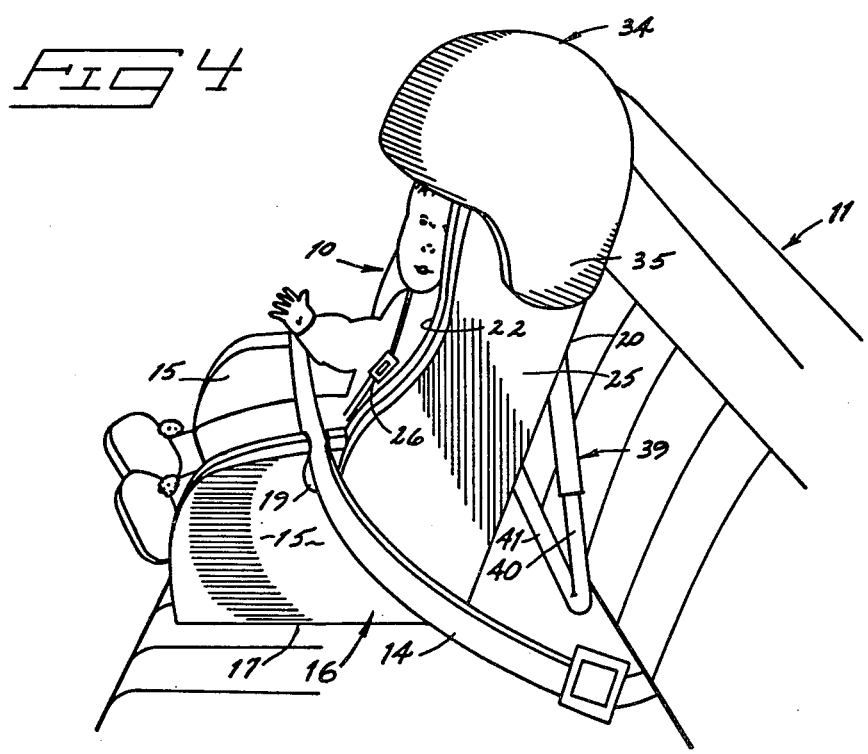

PROTECTIVE CHILD CARRIER ASSEMBLY

BACKGROUND OF THE INVENTION

The present invention relates to protective carriers for children and more particularly to such carriers that may be mounted to vehicles.

Present day "infant seats" or "car carriers" for infants and small children leave much to be desired concerning the actual safety afforded the child rider. Some are effectively designed to protect against forward, backward and lateral impact. None that this inventor is aware of offer substantial head or upper torso protection. What protects a child's head, for example, when a vehicle rolls over onto its top beyond the vehicle top itself? This question has even further reaching safety implications when bicycle "carriers" are considered. A small child on a bicycle is nearly totally exposed to the elements. To make matters worse, the child may be strapped to a machine that can of itself cause very serious injury, notwithstanding the injury caused by ground contact. Couple these frightening revelations with the flimsy nature of the standard bicycle "carrier" and the potential for serious injury becomes so likely that one shudders at the prospect.

Protection for small children riding on the backs of bicycles should at least be similar to that afforded by "car seats" or even more so because the child on a bicycle does not have the protection of a roof. The typical bicycle carrier simply affords no protection for the most critical and vulnerable area of the human anatomy—the head. Even carriers with high seat backs are not sufficiently effective since they offer no protection against lateral or downward impact to the head.

The above problem is recognized to a limited extent by Lewis in U.S. Pat. No. 4,026,448. Lewis discloses a modified "infant seat" used as a protective head and backrest attachment for existing bicycle carriers. Various restraints are disclosed for holding the "sleeper" to the bicycle carrier and for holding the child's head still within the carrier.

The back and top of the device extend forwardly over the infant's head to provide impact protection. The device, however, has limited application to existing forms of bicycle carriers and would not be applicable to "car carriers".

At present, vehicle carriers and other children's seats are rigid, usually molded units. The only adjustment afforded is by changing the overall position of the complete carrier. When a child is to be laid back from sitting to a supine position, her knees and feet are automatically elevated, since they must remain in the same position defined by the rigid carrier. The single position becomes uncomfortable for the child and can make simple diaper changing a difficult task.

Transferability of a child carrier from one vehicle to another (such as from autos to bicycles) is another difficulty that has been recognized and yet remains substantially unresolved. Bicycle carriers require some form of safety provision to keep the child rider's feet clear of the wheel spokes. So, bicycle carriers often have integral "stirrups" or "leg wells" to shield the foot and lower leg areas from the spokes. These are effective or bicycle safety but are not necessary and, in fact, render that type of carrier unusable as a form of seat mounted automobile carrier. The stirrups do not allow the carrier to assume a natural upright sitting position on a relatively flat car seat.

The present invention provides an adequate solution to all of the above mentioned problems by presenting a versatile carrier that can be easily adapted for use on a bicycle or within a driven vehicle such as a car. Furthermore, the present carrier includes distinctive features in a removable covering and backrest adjustment that increase the overall safety of the rider and add to her comfort.

BRIEF DESCRIPTION OF THE DRAWINGS

FIG. 1 is an exploded pictorial view of the present carrier about to be mounted to a bicycle;

FIG. 2 is a bottom plan view of a base section of the present carrier;

FIG. 3 is a pictoral view illustrating the present carrier used in an automobile;

FIG. 4 is a view similar to FIG. 3 only showing a different position for the carrier in the automobile;

DETAILED DESCRIPTION OF A PREFERRED EMBODIMENT

Figure 5:
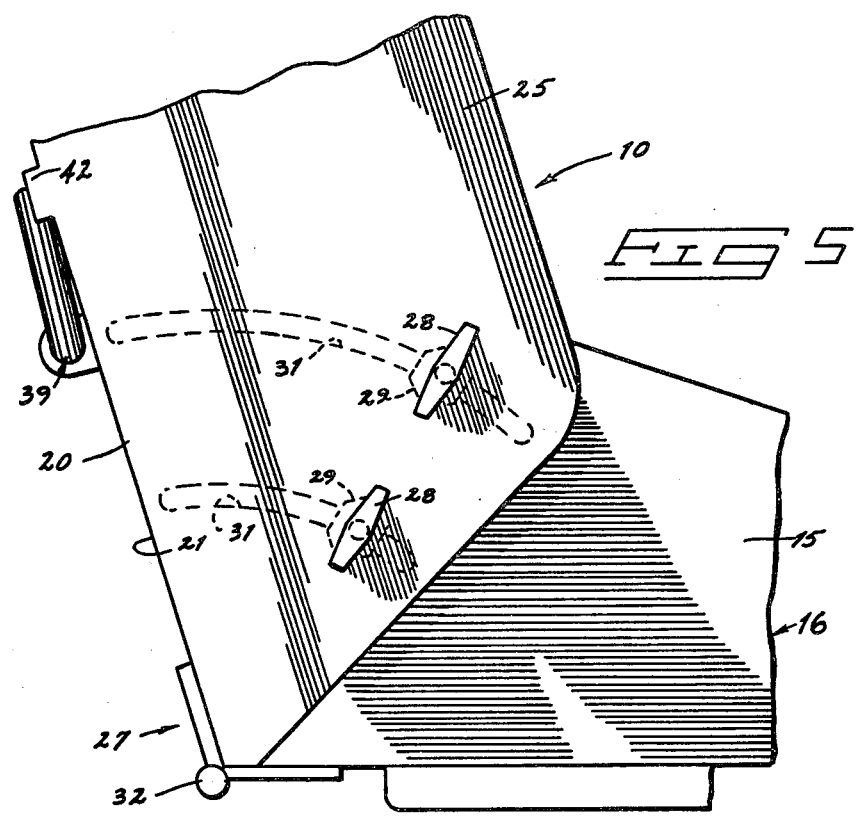
FIG. 5 is a detail view illustrating an adjustment mechanism allowing angular positioning of the backrest portion of the present carrier.

The present carrier is generally designated at 10 in the accompanying drawings. The carrier 10 is designed primarily for use as protective seating for a child or infant riding in a vehicle 11. The "vechicle" 11 may be an automobile, truck, airplane, or other vehicle having a fixed seat with releasable seat belts. A typical car seat is shown in FIGS. 3 and 4 at 12 with the carrier 10 mounted thereto. The carrier is secured to the seat 12 by a seat belt 14. "Vehicle" 11 may also include bicycles as partially shown in FIG. 1 at 13.

The present carrier 10 includes a base section 16. The base section 16 includes a substantially flat downwardly facing bottom support surface 17 that is adapted to rest against a horizontal support surface. In fact, the bottom support surface 17 may be provided with a skid resistant covering such as rubber (not shown) to facilitate such placement.

The base section 16 includes an upwardly facing seat surface 18. The seat surface 18 opposes the bottom support surface 17. Surface 18 is defined by upright protective side walls 15 that each include a seat belt receiving notch 19. The purpose for the notches 19 is illustrated in FIGS. 3 and 4. The seat belt is shown there extending through the notches 19 as means to securely hold the carrier and occupant in position within the vehicle 11. Note that the notches 19 can be used effectively to hold the carrier in position whether the carrier is facing forwardly or backwardly.

A backrest section 20 is mounted to the base section 16. The backrest section 20 normally extends upwardly of the base section 16 and includes a back support surface 21 that, like a chair back, is formed to receive and support the upper torso of the rider.

Both sections 16 and 20 are preferably formed of an impact resistant material such as high impact plastic "ABS", or other appropriate material.

A formed cushion 22 is fitted to the carrier, covering the surfaces 18 and 21 of the base section 16 and backrest section 20. The cushion 22 is preferably formed of a single piece of soft, washable material that provides comfort to the rider and that can be easily cleaned. A fold 23 along the cushion intermediate the backrest section 20 and base section 16 allows the cushion to be folded between the upright sitting position shown in the drawings and a substantially horizontal supine position that is indicated by dashed lines in FIG. 5.

The backrest section includes forwardly projecting shoulder side walls 25 to afford lateral protection against impact. The shoulder side walls may be enlarged at the approximate level of the rider's shoulders to afford mobility to the rider.

Harness straps 26 of relatively conventional form may be supplied within the confines of the backrest section 20 and base section 16. The straps 26 are provided to secure the rider to the carrier. It is preferred that a strap or harness arrangement 26 be provided that includes both a shoulder harness configuration and a lap seat belt for maximum safety. The particular nature of harness and seat belt construction are well known and within the common knowledge of many in the field of vehicle safety equipment.

The backrest section 20 is pivotally mounted to the base section 16. The backrest section will pivot about a substantially horizontal axis between a substantially supine position (dashed lines in FIG. 5) and an upright sitting position (FIGS. 1, 3, and 4). A pivot means 27 is provided to facilitate such adjustable movement.

Pivot means 27 is shown in detail by FIG. 5. Means 27 includes adjusting bolts 28 that may be threadably mounted to the backrest section 20 to communicate with clamp nuts 29 held within the side walls of the base section 16. The adjusting bolts 28 are received within arcuate slots 31 formed in the base 16. The arcuate slots 31 are formed on radii from the axis of a hinge 32 that pivotably joins the backrest and base sections 20 and 16.

The adjusting bolts 28 can be selectively loosened to allow pivotal motion of the backrest 20 relative to the base section, or tightened to securely clamp the backrest section in a selected rigid angular position in relation to the base section 16. Angular adjustment of the backrest allows the user to selectively vary the posture of the child resting in the carrier between a full sitting position and a supine position.

A protective hood 34 is releasably mountable to the backrest section 20. The protective hood 34 extends forwardly over the seat surface 18 for the purpose of protecting the rider's head from impact.

The protective hood 34 is preferably dome shaped. The curved configuration of the hood will deflect blows away from the rider. Furthermore the dome configuration is inherently stronger than, for example, a flat covering. The hood is preferably constructed of a high impact shell, lined with a soft, padded inner surface.

Figure 6:
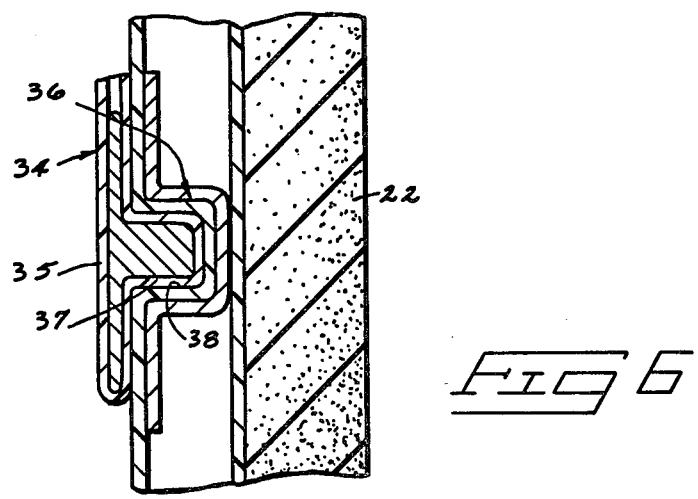
FIG. 6 is a detail sectional view illustrating releasable interconnection between the cover element and the backrest section of the present carrier.

The hood 34 includes downwardly extending flanges 35 that are received over the backrest section 20. Means 36 is provided within the flanges and corresponding surfaces of the backrest section for adjustably securing the hood to the backrest. FIG. 6 illustrates an example of means 36 wherein buttons 37 are provided on the hood flanges 35 and interfitting recesses 38 are located along the backrest. Several of the recesses 38 may be spaced vertically on the backrest to allow selective positioning of the protective hood 34. The hood will therefore be adjustable for small or larger children.

A brace means 39 may be provided on the backrest section 20. The brace means 39 as shown in FIGS. 3 and 4, may include at least one extensible leg 40 that is pivotably mounted at its upper end to a rearward surface of the backrest section 20. The extensible leg 40 extends to a foot 41. The leg 40 may telescope, allowing selective positioning of the foot 41 away from the backrest.

FIG. 3 illustrates the brace means used to support the backrest in position using the extensible leg 40 and foot 41 as a brace against the floor surface of the vehicle. The brace means has been retracted in the FIG. 4 position to brace the carrier against the vehicle seat.

The brace means 39 can be selectively secured in a closed, inoperative position by an appropriate clamp 42 against the backrest section 20 when the carrier is to be used alone or in conjunction with another vehicle such as the bicycle as shown in FIG. 1. The folded configuration would also be used when the pivot means 27 is utilized to adjust the backrest and base section to a relatively flat, supine position.

FIG. 1 illustrates the carrier assembly especially adapted for use in conjunction with bicycles. Here, means is provided in the form of a bicycle bracket 43 and a cooperating slot 45 of the base 16 to securely mount the base section 16 and backrest section 20 to a bicycle "vehicle" 11. The carrier is therefore easily converted from the "car carrier" unit shown in FIGS. 3 and 4 to a "bicycle carrier". The bicycle bracket 43 includes a rigid tubular frame 44 that may be appropriately secured to the bicycle frame. The bracket may therefore remain as part of the bicycle framework, and may be used for supporting other objects when the carrier is not mounted in place.

The bicycle bracket 43 "dovetails" into a complementary slot 45 formed integrally in the base section 16. The base section 16 may be provided with appropriate latches 46 that will automatically engage notches 47 formed in the bracket 43 when the base is in position. The latches hold the base securely to the bracket. The base can be manually released by forceably releasing the latches from the appropriate bracket notches.

The bicycle bracket 43 includes integral "stirrups" 48 that extend downwardly to receive the lower legs and feet of a rider seated on the base section 16. The stirrups 48 are positioned on opposite sides of the bracket to straddle the bicycle frame and are positioned to align with the front edge of the base section 16 when mounted to the bracket. The stirrups may be used for other purposes when not in use for receiving and protecting the lower legs and and feet of a child rider. It has been found that the stirrups are very useful, for example, for carrying bottles, milk cartons, or thermos.

The protective hood is an extremely important part of the present carrier 10 when used with the bracket 43 on a bicycle. The hood 34 will protect the rider from blows directed toward the head and upper torso area. It will also protect the rider in case of a fall, which is the far more typical injury causing incident associated with bicycle riding. The rider, during a fall, will be held securely in position by the straps 26 with her head protected by the hard outer surface of the protective hood 34 and the soft inner lining of the hood and cushion 22.

The present base section and backrest are attached to the bicycle bracket simply by holding the latches 46 outwardly or allowing them to cam against sides of the bracket as the base is slidably engaged over the horizontal bracket section. The latches 46 may then be allowed to snap into secure engagement with the notches 47 to prevent backward movement of the base and backrest from the bracket. The unit is thereby secured to a bicycle. A child can then be placed on the carrier and secured by the straps 26. Her feet can be received within the protective stirrups 48 that automatically come into proper alignment with the base section when the bracket and base section are secured together. The rider is protected by the hard material of the back rest and base section, and especially by the protective hood 34.

It may be noted that the hood 34 can be removed while the child is being put into or taken from the carrier. The hood may be removed simply by prying the flanges 35 outwardly until the buttons 37 leave engagement with the appropriate recesses 38. The hood can then be lifted off the backrest. Mounting the hood simply invovles a reversal of the removal process.

The carrier can be easily dismounted from a bicycle and used within an automobile simply by disengaging the snap latches 46 from the notches 47 and pulling the backrest and base section rearwardly from the bicycle bracket 43. The unit can then be situated on a vehicle seat as shown in FIGS. 3 or 4, depending on the preference of the user. If the FIG. 3 position is desired, the brace means 39 is used to brace the backrest section in position. In this position, the backrest can be selectively adjusted through pivot means 27 to a nearly supine position. The telescoping leg 40 will allow selective adjustment of the backrest between the sitting and supine position while affording support from the vehicle floor surface.

Either position facilitates the use of the seat belt receiving notches 19. The notches 19 receive the seat belt 14 and hold the unit securely in realtion to the vehicle seat. In FIG. 3, the seat belt is used in conjunction with the brace means 39 to hold the unit in position.

The carrier can also be used beneficially in other applications that may become evident. For example, the carrier can be used simply as a "infant seat" separate from a vehicle. Such use is especially facilitated by the pivot means 27 which enables selective adjustment of th backrest means between the sitting and supine positions.

I claim:

1. A protective child carrier assembly capable of being interchangeably mounted to either an automobile having a seat and safety seat belt, or a bicycle having a rigid frame, said carrier assembly comprising:
   a base section having a smooth downwardly facing flat bottom surface for supporting the carrier assembly on the seat of a an automobile, and an opposite upwardly facing top surface for receiving and supporting a child;
   said base section having a forwardly open slot formed therein adjacent the smooth flat bottom surface;
   means on the base section for releasably receiving a safety seat belt of an automobile to selectively secure the base to the vehicle;
   a backrest section having a back support surface;
   pivot means mounting the backrest section to the base section for adjustably securing the backrest section at a selected angular position in relation to the base section;
   an elongated bicycle mounting bracket having opposed longitudinal side edges adapted to be releasably received within the forwardly open slot of the base section by sliding motion of the base section forwardly over the bracket;
   said mounting bracket side edges each having a notch formed therein;
   latch means adjacent the flat bottom surface of the base section and on opposite sides of the forwardly open slot for releasably securing the base and backrest sections to the bicycle mounting bracket with the latch means engaging the notches; and
   means for securing the bicycle mounting bracket to the rigid frame of a bicycle.

2. The carrier as claimed by claim 1 further comprising:
   extensible brace means mounted to the backrest section and foldable thereon between an inoperative position flush against the backrest section and an operative position extending angularly outward from the backrest section;
   wherein the brace means includes a horizontal foot at the lowr end of an extensible leg, the upper end of the leg being pivotally monted to the backrest section, said leg being extensible to selectively space the foot from the backrest section.

3. The carrier as claimed by claim 1 further comprising protective hood means releasably mountable to the backrest section and including protective padding to shelter the head of a child seated on the base section.

4. The carrier assembly as claimed by claim 1 wherein said bracket includes foot and lower leg receiving stirrups on opposite transverse sides thereof adapted to cooperate with the carrier when mounted to the mounting bracket to receive and support the lower legs and feet of a child seated on the base section of the carrier.

5. The carrier as claimed by claim 3 further comprising means for adjustably mounting the protective cover to the backrest at any of several selected distances from the seat surfaces.

6. The carrier as claimed in by claim 1 further comprising pivot means mounting the backrest section to the base section, for adjustably securing the backrest section at a selected angular position in relation to the base section.

7. A protective carrier assembly for a child, interchangeably mountable to an automobile having a seat with a safety seat belt, or a bicycle having a rigid frame, said carrier assembly comprising:
   a base section having a smooth downwardly facing flat bottom surface for resting flush against the seat of a vehicle such as an automobile, and an opposite upwardly facing top surface for receiving and supporting a child;
   said base section having forward and rearward end edges joining the top and bottom surfaces;
   a slot formed in the base section above the flat bottom surface opening at the forward end edge and closed at the rearward end edge;
   means on the base section for releasably receiving a safety seat belt of an automobile and releasably securing the base to the vehicle;
   a backrest section mounted to the base section adjacent the rearward end edge thereof;
   a bicycle mounting bracket having a flat top surface shaped complementary to the slot in said base section, said bracket being adapted to be slidably receivable in the slot through the forward opening therein by forward sliding motion of the base section over the bicycle mounting bracket;
   latch means for selectively securing the base section to the bicycle mounting bracket, said latch means being operable adjacent the flat bottom surface of the base section to engage the bicycle mounting bracket alongside its flat top surface as the base section is moved forwardly over the bicycle mounting bracket said latch means comprising latches on the base section adjacent the flat bottom surface and alongside the slot; and a pair of notches formed in the bicycle mounting bracket along the side edges thereof and positioned thereon such that the latch will engage the notches when the bicycle mounting bracket is fully received within the slot and means for securing the bicycle mounting bracket to a bicycle.

8. The carrier as claimed by claim 7 further comprising:

extensible brace means mounted to the backrest section and foldable thereon between an inoperative position flush against the backrest section and an operative position extending angularly outward from the backrest section;

wherein the brace means includes a horizontal foot at the end of an extensible leg, the leg being pivotally mounted to the backrest section and extensible to selectively space the foot from the backrest section.

9. The carrier assembly as claimed by claim 7 wherein the bicycle mounting bracket includes foot and lower leg receiving stirrups on opposite sides thereof, cooperating with the carrier when mountd to the bicycle mounting bracket to receive and support the lower legs and feet of a child seated on the base section.

10. The carrier as claimed by claim 9 further comprising protective hood means releasably mounted to the backrest section and including protective padding to shelter the head of a child seated on the base section.

11. The carrier as claimed by claim 10 further comprising means for adjustably mounting the protective hood means to the backrest at any of several selected distances from the seat surfaces.

12. The carrier as claimed by claim 7 further comprising pivot means mounting the backrest section to the base section, for adjustably securing the backrest section at a selected angular position in relation to the base section.

* * * * *